(12) United States Patent
Wang

(10) Patent No.: US 10,281,762 B2
(45) Date of Patent: May 7, 2019

(54) LIQUID CRYSTAL DISPLAY PANEL AND LIQUID CRYSTAL DISPLAY DEVICE

(71) Applicant: Wuhan China Star Optoelectronics Technology Co., Ltd., Wuhan, Hubei (CN)

(72) Inventor: Jiangfeng Wang, Hubei (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 0 days.

(21) Appl. No.: 14/778,154

(22) PCT Filed: Jun. 19, 2015

(86) PCT No.: PCT/CN2015/081957
§ 371 (c)(1),
(2) Date: Nov. 23, 2016

(87) PCT Pub. No.: WO2016/187917
PCT Pub. Date: Dec. 1, 2016

(65) Prior Publication Data
US 2017/0102580 A1 Apr. 13, 2017

(30) Foreign Application Priority Data
May 27, 2015 (CN) .......................... 2015 1 0278387

(51) Int. Cl.
*G02F 1/1333* (2006.01)
*G02F 1/1335* (2006.01)
(52) U.S. Cl.
CPC .. *G02F 1/133514* (2013.01); *G02F 1/133512* (2013.01); *G02F 1/133553* (2013.01);
(Continued)
(58) Field of Classification Search
CPC ..................... G02F 1/133514; G02F 1/133553
See application file for complete search history.

(56) References Cited

U.S. PATENT DOCUMENTS

| | | | |
|---|---|---|---|
| 5,734,457 A * | 3/1998 | Mitsui | G02F 1/133514 349/105 |
| 2007/0132921 A1* | 6/2007 | Yoon | B82Y 20/00 349/107 |

(Continued)

FOREIGN PATENT DOCUMENTS

| | | |
|---|---|---|
| CN | 1347516 | 5/2002 |
| CN | 101021650 | 8/2007 |

(Continued)

OTHER PUBLICATIONS

Search Report and Written Opinion, dated Apr. 3, 2016, for International Application No. PCT/CN2015/081957.
(Continued)

*Primary Examiner* — Alexander P Gross

(57) ABSTRACT

The liquid crystal display panel comprises an upper glass substrate and a lower glass substrate, wherein the upper glass substrate comprises a plurality of color-resist units, each of which comprises a red color-resist element, a green color-resist element, and a blue color-resist element that are spaced from one another, and a plurality of black matrixes each being arranged between two adjacent color-resist elements; and wherein the lower glass substrate comprises a plurality of optical filter layers arranged on an outside surface thereof, said optical filter layers corresponding to red color-resist elements, green color-resist elements, and blue color-resist elements respectively, and each optical filter layer having a color the same as a corresponding color-resist element. The structure of the liquid crystal display panel according to the present disclosure is simple. The light utilization ratio of the backlight source can be effectively improved, and thus the brightness of the liquid crystal display panel can be improved.

15 Claims, 1 Drawing Sheet

(52) U.S. Cl.
CPC ............ *G02F 2001/133302* (2013.01); *G02F 2203/055* (2013.01)

(56) References Cited

U.S. PATENT DOCUMENTS

| | | | | |
|---|---|---|---|---|
| 2008/0135098 A1* | 6/2008 | Ootani | ................ | H01L 31/055 136/263 |
| 2010/0289986 A1* | 11/2010 | Shikii | ................ | G02B 6/0028 349/65 |
| 2014/0085567 A1* | 3/2014 | Im | ................ | G02F 1/133555 349/62 |
| 2015/0370124 A1* | 12/2015 | Han | ................ | G02F 1/133514 349/12 |
| 2016/0161797 A1* | 6/2016 | Wu | ................ | G02F 1/133514 349/96 |

FOREIGN PATENT DOCUMENTS

| | | |
|---|---|---|
| CN | 101609230 | 12/2009 |
| CN | 101910713 | 12/2010 |
| CN | 102037399 | 4/2011 |

OTHER PUBLICATIONS

Office Action and Search Report, dated May 3, 2017, for Chinese Patent Application No. 201510278387.1.

\* cited by examiner

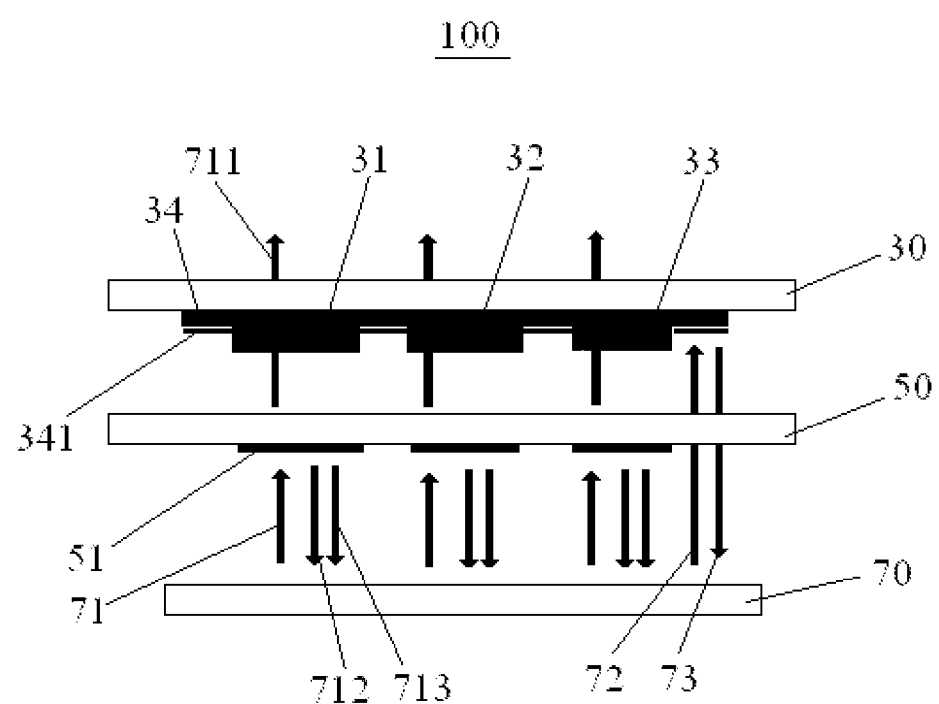

LIQUID CRYSTAL DISPLAY PANEL AND LIQUID CRYSTAL DISPLAY DEVICE

CROSS REFERENCE TO RELATED APPLICATION

The present application claims the priority of Chinese patent application CN 201510278387.1, entitled "Liquid Crystal Display Panel and Liquid Crystal Display Device" and filed on May 27, 2015, the entirety of which is incorporated herein by reference.

FIELD OF THE INVENTION

The present disclosure relates to the technical field of liquid crystal display, and particularly to a liquid crystal display panel and a liquid crystal display device.

BACKGROUND OF THE INVENTION

In a traditional liquid crystal display panel, a white Light-Emitting Diode (LED) generally serves as a light source thereof. The spectrum of the white LED comprises blue light component, green light component, and red light component. When white light irradiates the display panel, part of it would be absorbed by a black matrix, and the other part of it would be absorbed by a color filter. The red light component of the spectrum can transmit through a red color filter, while light of other colors can hardly transmit through the red color filter and thus most of it would be absorbed by the red color filter. Similarly, the green light component and the blue light component of the spectrum can transmit through a green color filter and a blue color filter respectively, while most of light of other colors would be absorbed by a corresponding color filter. Because of this property of the color filter, a penetration ratio of the light which is emitted by the LED and which can transmit through the color filter is less than 30 percent. Consequently, a large amount of light loss would be generated in a backlight module. In order to improve the brightness of the backlight module, the LEDs with a relatively large number or color filter made of superior materials should be used, and thus a cost of the backlight module would be increased inevitably.

In order to solve the aforesaid technical problem, a liquid crystal display panel in which a light utilization ratio of the light source in the backlight module thereof can be improved is needed, so that the brightness of the backlight module can be further improved.

SUMMARY OF THE INVENTION

With respect to the technical defect in the prior art, the present disclosure provides a liquid crystal display panel and a liquid crystal display device comprising the aforesaid liquid crystal display panel.

The present disclosure provides a liquid crystal display panel, which comprises an upper glass substrate and a lower glass substrate that are arranged opposite to each other, wherein the upper glass substrate comprises a plurality of color-resist units arranged thereon, each of which comprises a red color-resist element, a green color-resist element, and a blue color-resist element that are spaced from one another, and a plurality of black matrixes each being arranged between two adjacent color-resist elements; and wherein the lower glass substrate comprises a plurality of optical filter layers arranged on an outside surface thereof, said optical filter layers corresponding to red color-resist elements, green color-resist elements, and blue color-resist elements respectively, and each optical filter layer having a color the same as a corresponding color-resist element.

According to the present disclosure, the outside surface of the lower glass substrate is provided with the optical filter layers at positions corresponding to the red color-resist elements, the green color-resist elements, and the blue color-resist elements respectively, and the optical filter layers each have a color the same as that of the corresponding color-resist element. Therefore, after the selective transmission of the optical filter layer, in the light that is emitted by the backlight source, only light of a color the same as that of the corresponding color-resist element can transmit through the optical filter layer, while light of other colors is reflected. The light of other colors which is reflected by the optical filter layer can be utilized by the backlight source once again. Compared with the liquid crystal display panel in the prior art with no optical filter layer being arranged therein, in the liquid crystal display panel according to the present disclosure, the light loss resulted from the case that in the light that is emitted by the backlight source, the light of colors different from that of a corresponding color-resist element would be absorbed by the color-resist element, can be avoided. Therefore, a light utilization ratio of the backlight source can be significantly improved, and thus the brightness of the liquid crystal display device can be improved accordingly. Moreover, according to the present disclosure, only with the optical filter layers being affixed to the corresponding positions, a satisfactory display effect of the liquid crystal display device can be realized. The production procedure thereof is simple and convenient to be performed.

According to some embodiments, the optical filter layers with different colors are arranged on an outside surface of the lower glass substrate far from the upper glass substrate. With this arrangement, the manufacturing procedure of the display panel can be simplified. The optical filter layers only need to be affixed to the outside surface of the lower glass substrate, whereby the inconvenience brought about by the optical filter layers being affixed to an inside surface of the lower glass substrate can be avoided.

According to some embodiments, a light transmission area of each of the optical filter layers with different colors is the same as that of a corresponding color-resist element. With this arrangement, it can be guaranteed that the light which transmits through the optical filter layer can transmit through the corresponding color-resist element with the same color completely, and the light which cannot transmit through the optical filter layer can be reflected to the backlight source, so that the light that is emitted by the backlight source can be utilized to the largest extent.

According to some embodiments, the optical filter layers with different colors each are formed by a plurality of film layers with different refractive indexes in a laminated manner. The different light transmission properties of the optical filter layers can be realized through controlling a number of the film layers thereof, a thickness of each layer and a laminated mode thereof, so that the light of different wave bands can transmit through the optical filter layers in a selective manner. In this manner, the optical filter layers can cooperate with the corresponding color-resist elements with different colors, so that a better light-exiting effect can be realized.

According to some embodiments, the film layers each are made of a material selected from a group consisting of $SiO_2$, $TiO_2$, $MgF_2$.

According to some embodiments, at least part of an outside surface of each of the black matrixes is covered with a reflection layer. With this arrangement, the light that is emitted by the backlight source can be prevented from irradiating the black matrixes directly and thus being absorbed by the black matrixes. The light can be reflected to the backlight source by the reflection layer and be utilized by the backlight source once again, and thus the light utilization ratio of the backlight source can be improved.

According to some embodiments, the reflection layer covers each of the black matrixes totally. The light loss resulted from the light entered therein being absorbed by the black matrix can be completely avoided through arranging the reflection layer covering the black matrix totally. The light that is reflected to the backlight source by the reflection layer can be utilized fully, so that the light utilization ratio of the backlight source can be further improved.

According to some embodiments, the reflection layer is arranged parallel to the lower glass substrate. If the reflection layer is arranged inclined to the lower glass substrate, part of the white light would be reflected to the color-resist element and be absorbed by the color-resist element, and the other part of the white light would enters the optical filter layer. In this case, the light of the color the same as that of the corresponding color-resist element can transmit through the optical filter layer and exit from the lower glass substrate, while light of other colors would be reflected to the corresponding color-resist element. However, since the light of other colors cannot transmit through the color-resist element, it would be absorbed by the color-resist element instead. Consequently, the light loss would be inevitable. The reflection layer is arranged parallel to the lower glass substrate, so that incident light can be reflected to the backlight source directly, and the light loss when the reflection layer is arranged inclined to the lower glass substrate can be avoided.

According to some embodiments, the reflection layer is a metal layer. The metal layer is preferably an Al layer or an Ag layer. The metal layer can be coated on the surface of the black matrix directly, and the procedure thereof is simple and convenient to be performed.

The present disclosure further provides a liquid crystal display device, which comprises the aforesaid liquid crystal display panel.

Compared with the prior art, the following advantages can be brought about according to the present disclosure.

1) According to the present disclosure, the optical filter layers each with a color the same as that of a corresponding color-resist element are affixed to the lower glass substrate, so that the light of a color the same as that of the corresponding color-resist element can transmit through the optical filter layer and exit from the upper glass substrate, while light of other colors is reflected by the optical filter layer to the backlight source. In this case, the light of other colors can be prevented from being absorbed by the color-resist element. Therefore, the light utilization ratio of the backlight source can be improved, and thus the brightness of the liquid crystal display device can be improved accordingly.

2) According to the present disclosure, only with the optical filter layers being affixed to the corresponding positions, a satisfactory display effect of the liquid crystal display device can be realized. The production procedure of the liquid crystal display device is simple and reliable, and the production cost thereof is relatively low.

3) According to the present disclosure, each of the black matrixes is covered with a reflection layer, so that the light that is absorbed by the black matrix can be reduced. Meanwhile, the light that is reflected by the reflection layer to the backlight source can be utilized by the backlight source once again, and thus the light utilization ratio of the backlight source can be further improved.

BRIEF DESCRIPTION OF THE DRAWING

The present disclosure will be illustrated in detail hereinafter with reference to the embodiments and the drawing. In the drawing:

FIG. 1 schematically shows a structure of a liquid crystal display panel according to the present disclosure.

In the drawing, a same component is represented by a same reference sign. The drawing is not drawn according to actual scale.

DETAILED DESCRIPTION OF THE EMBODIMENTS

The present disclosure will be further illustrated hereinafter with reference to the drawing.

The details described herein are only specific examples used for discussing the implementations of the present disclosure. The most useful and most understandable description on the principle and concept of the present disclosure is provided. The structural details which go beyond the scope of basic understanding of the present disclosure are not provided herein. Therefore, those skilled in the art can clearly understand, based on the description and the accompanying drawings, how to implement the present disclosure in different ways.

FIG. 1 schematically shows a structure of a liquid crystal display panel 100 according to the present disclosure. The liquid crystal display panel 100 comprises a backlight source 70, and an upper glass substrate 30 and a lower glass substrate 50 that are arranged opposite to each other. The upper glass substrate 30 comprises a plurality of color-resist units, and the color-resist units each comprise a red color-resist element 31, a green color-resist element 32, and a blue color-resist element 33 that are spaced from one another. The upper glass substrate 30 further comprises a plurality of black matrixes 34 each being arranged between two adjacent color-resist elements. The lower glass substrate 50 comprises a plurality of optical filter layers 51 (only one optical filter layer 51 is shown in FIG. 1 as an example) which are arranged on an outside surface thereof. The optical filter layers 51 correspond to the red color-resist elements 31, green color-resist elements 32, and blue color-resist elements 33 respectively, and each have a corresponding color. It should be noted that, the optical filter layers 51 each have a color the same as that of a corresponding color-resist element, so that light of a color the same as that of the corresponding color-resist element can transmit therethrough.

According to the present disclosure, the outside surface of the lower glass substrate 50 is provided with the optical filter layers 51 at positions corresponding to the red color-resist elements 31, the green color-resist elements 32, and the blue color-resist elements 33 respectively, and the optical filter layers 51 each have a color the same as that of the corresponding color-resist element. Therefore, after the selective transmission of the optical filter layer 51, in the light that is emitted by the backlight source 70, only light of a color the same as that of the corresponding color-resist element can transmit through the optical filter layer 51, while light of other colors is reflected. The light of other colors which is reflected by the optical filter layer 51 can be utilized by the backlight source 70 once again. Compared with the liquid crystal display panel in the prior art with no optical filter layer being arranged therein, in the liquid crystal display panel according to the present disclosure, the light loss resulted from the case that in the light that is emitted by the backlight source 70, the light of colors different from that of a corresponding color-resist element would be absorbed by the color-resist element, can be avoided. Therefore, a light utilization ratio of the backlight source 70 can be significantly improved, and thus the brightness of the liquid crystal display panel 100 can be improved accordingly. Moreover, according to the present disclosure, only with the optical filter layers 51 being affixed to the corresponding positions, a satisfactory display effect of the liquid crystal display panel can be realized. The production procedure thereof is simple and convenient to be performed.

According to the embodiment as shown in FIG. 1, in white light 71 that is emitted by the backlight source 70, red light 711 can transmit through the red optical filter layer, then transmit through the red color-resist element 31, and exit from the upper glass substrate 30 at last, while blue light 712 and green light 713 are reflected by the red optical filter layer to the backlight source 70, and thus can be utilized by the backlight source 70 once again. Similarly, the color-resist elements of other colors and the optical filter layers with the corresponding colors all work on the same principle, and the details of which are no longer repeated here.

According to the present disclosure, the optical filter layers 51 with different colors each are arranged on an outside surface of the lower glass substrate 50 far from the upper glass substrate 30. With this arrangement, the manufacturing procedure of the display panel can be simplified. The optical filter layers 51 only need to be affixed to the outside surface of the lower glass substrate 50, whereby the inconvenience brought about by the optical filter layers 51 being affixed to an inside surface of the lower glass substrate 50 can be avoided.

Preferably, a light transmission area of each of the optical filter layers 51 with different colors is the same as that of a corresponding color-resist element. For example, the light transmission area of the red optical filter layer is the same as that of the red color-resist element 31. With this arrangement, it can be guaranteed that the red light which transmits through the red optical filter layer can transmit through the red color-resist element 31 completely, while the blue light 712 and the green light 713 which cannot transmit through the red optical filter layer can be reflected to the backlight source 70. Therefore, the light that is emitted by the backlight source 70 can be utilized to the largest extent, and the light utilization ratio of the backlight source can be improved.

According to the present disclosure, the optical filter layers 51 with different colors each are made of a plurality of film layers with different refractive indexes in a laminated manner. The different light transmission properties of the optical filter layers 51 can be realized through controlling a number of the film layers thereof, a thickness of each layer and a laminated mode thereof, so that the light of different wave bands can transmit through the optical filter layers in a selective manner. In this manner, the optical filter layers can cooperate with the corresponding color-resist elements with different colors, so that a better illumination effect can be realized. Preferably, the film layers each are made of a material selected from a group consisting of $SiO_2$, $TiO_2$, and $MgF_2$.

According to the present disclosure, as shown in FIG. 1, at least part of an outside surface of each of the black matrixes 34 is covered with a reflection layer 341. With this arrangement, the light that is emitted by the backlight source 70 can be prevented from irradiating the black matrixes 34 directly and thus being absorbed by the black matrixes 34. The light can be reflected to the backlight source 70 by the reflection layer 341 and be utilized by the backlight source 70 once again, and thus the light utilization ratio of the backlight source 70 can be improved.

Preferably, the reflection layer 341 covers each of the black matrixes 34 totally. In this manner, the light loss resulted from the light entered therein being absorbed by the black matrix 34 can be completely avoided. The light that is reflected to the backlight source 70 by the reflection layer 341 can be utilized fully, so that the light utilization ratio of the backlight source 70 can be further improved.

More preferably, the reflection layer 341 is arranged parallel to the lower glass substrate 50. For example, the light 72 that is emitted by the backlight source 70 reaches the reflection layer 341 after passing through the lower glass substrate 50. Since the lower glass substrate 50 is parallel to the reflection layer 341, a vertically-exiting light 73 can be formed after the incident light 72 is reflected, and can reach the backlight source 70 at last. If the reflection layer 341 is arranged inclined to the lower glass substrate 50, the light transmission route thereof will be illustrated below taking the red color-resist element 31 as an example. When the incident light 72 reaches the reflection layer 341, part of the white light would be reflected to the red color-resist element 31 and be absorbed by the red color-resist element 31, and the other part of the white light would enters the red optical filter layer. In this case, the red light can transmit through the red optical filter layer and exit from the lower glass substrate 50, while the blue light and the green light would be reflected to the red color-resist element 31. However, since the blue light and the green light cannot transmit through the red color-resist element 31, they would be absorbed by the red color-resist element 31 instead. Consequently, the light loss would be inevitable. Therefore, compared with the case that the reflection layer 341 is arranged inclined to the lower glass substrate 50, in the display panel according to the present disclosure, the light utilization ratio of the backlight source 70 can be further improved.

Preferably, the reflection layer 341 is a metal layer. The metal layer is preferably an Al layer or an Ag layer. The metal layer can be coated on the surface of the black matrix 34 directly, and the procedure thereof is simple and convenient to be performed.

The present disclosure further provides a liquid crystal display device, which comprises the aforesaid liquid crystal display panel 100. Other structures of the liquid crystal display device can be arranged the same as or similar to those of the display device in the prior art, and the operation principle thereof is well known to those skilled in the art. The details of which are no longer repeated here.

It should be noted that, the above embodiments are described only for better understanding, rather than restricting the present disclosure. Those skilled in the art can make amendments to the present disclosure within the scope as defined in the claims and without departing from the spirit and scope of the present disclosure. The present disclosure is described according to specific methods, materials, and implementations, but the present disclosure is not restricted by the details disclosed herein. On the contrary, the present disclosure is applicable for the equivalent structures, methods, and applications with the same functions as those defined in the claims.

The invention claimed is:

1. A liquid crystal display panel, comprising an upper glass substrate and a lower glass substrate that are arranged opposite to each other,
wherein the upper glass substrate comprises a plurality of color-resist units arranged thereon, each of which comprises a red color-resist element, a green color-resist element, and a blue color-resist element that are spaced from one another, and a plurality of black matrixes each being arranged between two adjacent color-resist elements; and
wherein the lower glass substrate comprises a plurality of optical filter layers arranged on an outside surface thereof, said optical filter layers corresponding to red color-resist elements, green color-resist elements, and blue color-resist elements respectively, and each optical filter layer having a color the same as a corresponding color-resist element, wherein said optical filter layers corresponding to red color-resist elements, green color-resist elements, and blue color-resist elements are arranged on the same plane and each are spaced horizontally from one another;
wherein a light transmission area of each of the optical filter layers with different colors is the same as that of a corresponding color-resist element.

2. The liquid crystal display panel according to claim 1, wherein the optical filter layers with different colors are arranged on an outside surface of the lower glass substrate far from the upper glass substrate.

3. The liquid crystal display panel according to claim 2, wherein the optical filter layers with different colors each are formed by a plurality of film layers with different refractive indexes in a laminated manner.

4. The liquid crystal display panel according to claim 3, wherein the film layers each are made of a material selected from a group consisting of $SiO_2$, $TiO_2$, and $MgF_2$.

5. The liquid crystal display panel according to claim 1, wherein the optical filter layers with different colors each are formed by a plurality of film layers with different refractive indexes in a laminated manner.

6. The liquid crystal display panel according to claim 5, wherein the film layers each are made of a material selected from a group consisting of $SiO_2$, $TiO_2$, and $MgF_2$.

7. The liquid crystal display panel according to claim 1, wherein at least part of an outside surface of each of the black matrixes is covered with a reflection layer.

8. The liquid crystal display panel according to claim 7, wherein the reflection layer covers each of the black matrixes totally.

9. The liquid crystal display panel according to claim 7, wherein the reflection layer is arranged parallel to the lower glass substrate.

10. The liquid crystal display panel according to claim 7, wherein the reflection layer is a metal layer.

11. A liquid crystal display device, comprising a liquid crystal display panel, which comprises an upper glass substrate and a lower glass substrate that are arranged opposite to each other,
wherein the upper glass substrate comprises a plurality of color-resist units arranged thereon, each of which comprises a red color-resist element, a green color-resist element, and a blue color-resist element that are spaced from one another, and a plurality of black matrixes each being arranged between two adjacent color-resist elements; and
wherein the lower glass substrate comprises a plurality of optical filter layers arranged on an outside surface thereof, said optical filter layers corresponding to red color-resist elements, green color-resist elements, and blue color-resist elements respectively, and each optical filter layer having a color the same as a corresponding color-resist element, wherein said optical filter layers corresponding to red color-resist elements, green color-resist elements, and blue color-resist elements are arranged on the same plane and each are spaced horizontally from one another;
wherein a light transmission area of each of the optical filter layers with different colors is the same as that of a corresponding color-resist element.

12. The liquid crystal display device according to claim 11, wherein the optical filter layers with different colors are arranged on an outside surface of the lower glass substrate far from the upper glass substrate.

13. The liquid crystal display device according to claim 11, wherein at least part of an outside surface of each of the black matrixes is covered with a reflection layer.

14. The liquid crystal display device according to claim 11, wherein the optical filter layers with different colors each are formed by a plurality of film layers with different refractive indexes in a laminated manner.

15. The liquid crystal display device according to claim 14, wherein the film layers each are made of a material selected from a group consisting of $SiO2$, $TiO2$, and $MgF2$.

* * * * *